US012704129B2

(12) United States Patent
Wang et al.

(10) Patent No.: US 12,704,129 B2
(45) Date of Patent: Aug. 11, 2026

(54) FAN ASSEMBLY

(71) Applicant: Illinois Tool Works Inc., Glenview, IL (US)

(72) Inventors: Yuwei Wang, Suzhou (CN); De Wei, Suzhou (CN)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 18/712,941

(22) PCT Filed: Nov. 25, 2022

(86) PCT No.: PCT/US2022/051003
§ 371 (c)(1),
(2) Date: May 23, 2024

(87) PCT Pub. No.: WO2023/097059
PCT Pub. Date: Jun. 1, 2023

(65) Prior Publication Data

US 2025/0035125 A1 Jan. 30, 2025

(30) Foreign Application Priority Data

Nov. 26, 2021 (CN) ......................... 202111419294.8

(51) Int. Cl.
*F04D 29/28* (2006.01)
*B23K 1/008* (2006.01)
(Continued)

(52) U.S. Cl.
CPC ............ *F04D 29/281* (2013.01); *B23K 1/008* (2013.01); *F04D 25/02* (2013.01); *F27B 9/3005* (2013.01); *F27D 7/04* (2013.01); *F27D 2007/045* (2013.01)

(58) Field of Classification Search
CPC ........ F04D 29/281; F04D 25/02; F04D 25/06; F04D 29/263; F04D 29/626; F04D 17/16;
(Continued)

(56) References Cited

U.S. PATENT DOCUMENTS 3,770,408 A * 11/1973 McCully .................. F27B 9/36 219/400
5,193,735 A * 3/1993 Knight .................. B23K 1/008 219/400
(Continued)

FOREIGN PATENT DOCUMENTS

CN 107709793 2/2018
CN 210033913 U * 2/2020
(Continued)

OTHER PUBLICATIONS

Int'l Search Report and Written Opinion Appln No. PCT/US2022/051003 mailed Mar. 16, 2023.
Taiwanese search report Appln No. 111142153 dated Dec. 1, 2025.

*Primary Examiner* — Matthew T Largi
(74) *Attorney, Agent, or Firm* — McAndrews Held & Malloy, Ltd.

(57) ABSTRACT

The present application provides a fan assembly, this fan assembly is characterized by: a motor and an impeller, the motor having a motor body and a motor shaft extending from the motor body, a distal end of the motor shaft having a first positioning mark with a certain spacing from 5 a central axis of the motor shaft, the distal end of the motor shaft having an end surface, the first positioning mark being at least partially visible on the end surface, the impeller having an impeller center bore, and a second positioning mark being provided on the impeller, where when the motor shaft is inserted into the impeller center bore, and the central axis of the motor 10 shaft, the second positioning marker and the first positioning marker are on a same diameter of
(Continued)

the fan assembly, the impeller is mounted in place in a radial direction relative to the motor so that the fan assembly reaches dynamic balance during operation. The impeller and the motor in the present application are detachable.

18 Claims, 10 Drawing Sheets

(51) Int. Cl.

| | |
|---|---|
| ***F04D 25/02*** | (2006.01) |
| ***F27B 9/30*** | (2006.01) |
| ***F27D 7/04*** | (2006.01) |

(58) Field of Classification Search
CPC ...... F04D 25/08; F04D 29/023; F04D 29/122; F04D 29/30; F04D 29/054; B23K 1/008; F27B 9/3005; F27D 7/04; F27D 2007/045
See application file for complete search history.

(56) References Cited

U.S. PATENT DOCUMENTS

| | | | | |
|---|---|---|---|---|
| 11,111,929 | B2 | 9/2021 | Taki | |
| 2018/0368280 | A1* | 12/2018 | Johansen | F04D 25/02 |
| 2020/0200182 | A1* | 6/2020 | Taki | F04D 17/16 |

FOREIGN PATENT DOCUMENTS

| | | |
|---|---|---|
| DE | 102007016343 | 10/2008 |
| EP | 1181455 | 2/2002 |
| JP | H06194053 | 7/1994 |
| TW | M516101 | 1/2016 |

* cited by examiner

FAN ASSEMBLY

CROSS-REFERENCE TO RELATED APPLICATIONS

The present application is a national stage application under 35 U.S.C. § 371 of application Serial No. PCT/US2022/051003, filed on Nov. 25, 2022, and entitled "FAN ASSEMBLY" which also claims priority to Chinese application No. 202111419294.8, filed on Nov. 26, 2021. The aforementioned application is hereby incorporated herein by reference in its entirety.

TECHNICAL FIELD

The present application relates to a fan assembly, particularly a fan assembly applied in a reflow oven.

BACKGROUND

During production of printed circuit boards, electronic elements are typically mounted to circuit boards by a process called "reflow soldering." In a typical reflow soldering process, a solder paste (e.g., a tin paste) is deposited into a selected area on a circuit board and wires of one or more electronic elements are inserted into the deposited solder paste. The circuit board is then enabled to pass through a reflow oven in which the solder paste is refluxed (i.e. heated to a melt or reflux temperature) in a heating area and then cooled in a cooling area to electrically and mechanically connect the wires of the electronic elements to the circuit board. As used herein, the term "circuit board" includes a substrate assembly of any type of electronic element, such as including a wafer substrate.

Soldering pastes include not only solder, but also fluxes that make the solder wet and provide good welding seams. After the solder paste is deposited on the circuit board, the circuit board is conveyed on a conveyor to pass through the heating area within the furnace of the reflow oven. Heat in the heating area causes the solder paste to melt and at the same time vaporizes a flux in the solder paste and volatile organic compounds other additives to form vapor. Flux vapor within the furnace may recondense to form viscous fluid.

The furnace of the reflow oven is provided with a fan assembly to facilitate flow of air inside the furnace, so that the temperature inside the furnace is evenly distributed.

In the reflow oven, air or inert gas (e.g. nitrogen) is typically used as the working atmosphere, and different working atmospheres are used for circuit boards required by different processes. The working atmosphere is filled in the furnace of the reflow oven, and the circuit board is welded in the working atmosphere as it is conveyed through the furnace via the conveyor. When inert gas is used as the working atmosphere, outside air should be avoided as much as possible.

SUMMARY

The present application provides a fan assembly for a reflow oven, and the fan assembly in the present application is able to help conveniently replace a sealing device. The fan assembly comprises:

a motor and an impeller, the motor having a motor body and a motor shaft extending from the motor body, a distal end of the motor shaft having a first positioning mark with a certain spacing from a central axis of the motor shaft, the distal end of the motor shaft having an end surface, the first positioning mark being at least partially visible on the end surface, the impeller having an impeller center bore, and a second positioning mark being provided on the impeller, where when the motor shaft is inserted into the impeller center bore, and the central axis of the motor shaft, the second positioning marker and the first positioning marker are on a same diameter of the fan assembly, the impeller is mounted in place in a radial direction relative to the motor so that the fan assembly reaches dynamic balance during operation.

In the fan assembly according to the above, the fan assembly further comprises: a sealing device including a graphite gasket, the sealing device being sleeved on the motor shaft and disposed between the impeller and the motor body to form sealing between the impeller and the motor body; where the impeller is detachably connected to the motor so that the graphite gasket is replaceable, and the first positioning mark and the second positioning mark enable the impeller to be mounted in place in the radial direction relative to the motor when the impeller is remounted on the motor shaft.

In the fan assembly according to the above, the first positioning marker is a positioning recess recessed inwardly from the end surface.

In the fan assembly according to the above, the impeller has a mounting portion located in the center of the impeller, the impeller center bore runs through the mounting portion, the mounting portion has a proximal surface facing the motor body and a distal surface facing away from the motor body, and the second positioning marker is a positioning convex portion protruding from the distal surface.

In the fan assembly according to the above, the fan assembly further comprises: a fastener assembly including a positioning gasket and a fastening bolt, where the positioning gasket includes a gasket hole and a joint facing the impeller, the gasket hole of the positioning gasket is aligned with the impeller center bore, the joint of the positioning gasket abuts against the motor shaft, the positioning gasket is clamped between the mounting portion of the impeller and a head of the fastening bolt, and the fastening bolt passes through the gasket hole of the positioning gasket to securely connect to the motor shaft, so as to securely connect the impeller and the motor shaft; where the positioning gasket has a stop opening that engages with the positioning convex portion to limit rotation of the positioning gasket and the motor shaft connected to the positioning gasket relative to the impeller.

In the fan assembly according to the above, the stop opening is a recess formed by inwardly recessing an outer edge of the positioning gasket.

In the fan assembly according to the above, the positioning gasket includes a rear side facing the impeller, the rear side is provided with an annular convex portion disposed about the gasket hole, the annular convex portion forms the joint, and the annular convex portion is able to enter the impeller central bore for contact with the motor shaft.

In the fan assembly according to the above, the positioning convex portion is a positioning bolt mounted on the mounting portion of the impeller.

In the fan assembly according to the above, the fan assembly is used for a reflow oven, the impeller is located inside a furnace of the reflow oven, the motor body is outside the furnace of the reflow oven, and the sealing device is configured to isolate the interior of the furnace from the exterior of the furnace.

The present application also provides a reflow oven comprises: a furnace housing in which a furnace is formed; and the fan assembly according to the above, the fan assembly being disposed on the furnace housing, the impeller of the fan assembly being located inside the furnace of the reflow oven, and the motor body being located outside the furnace of the reflow oven.

The fan assembly in the present application is applied to a reflow oven, and therefore a sealing device is required to ensure the working atmosphere inside the furnace. A graphite gasket in the sealing device is a quick-wear piece and needs to be replaced. When the graphite gasket needs to be replaced, the impeller needs to be disassembled from the motor and mounted again after the replacement is complete. The fan assembly in the present application can still reach dynamic balance after the motor and the impeller are remounted by disposing the first and second positioning marks. Moreover, the fan assembly in the present application strengthens secure connection between the motor and the impeller through the positioning gasket.

DETAILED DESCRIPTION

Various specific embodiments of the present application will be described below with reference to the attached drawings that form a part of this Specification. It should be understood that while terms denoting orientation, such as "front," "rear," "upper," "lower," "left," "right," etc., are used in the present application to describe various exemplary structural parts and elements of the present application, these terms are used herein for convenience of illustration only and are determined based on the exemplary orientations shown in the attached drawings. Since the embodiments disclosed in the present application may be disposed in different orientations, these terms denoting orientation are for illustrative purposes only and should not be considered as limiting.

Figure 1A:
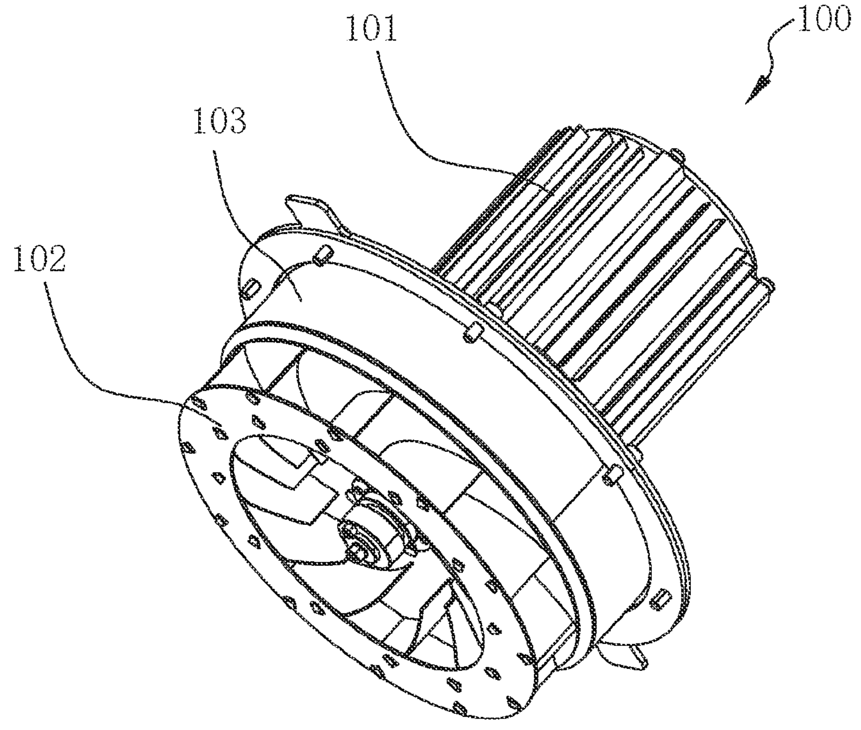
FIG. 1A is a perspective view of a fan assembly in the present application.
Figure 1B:
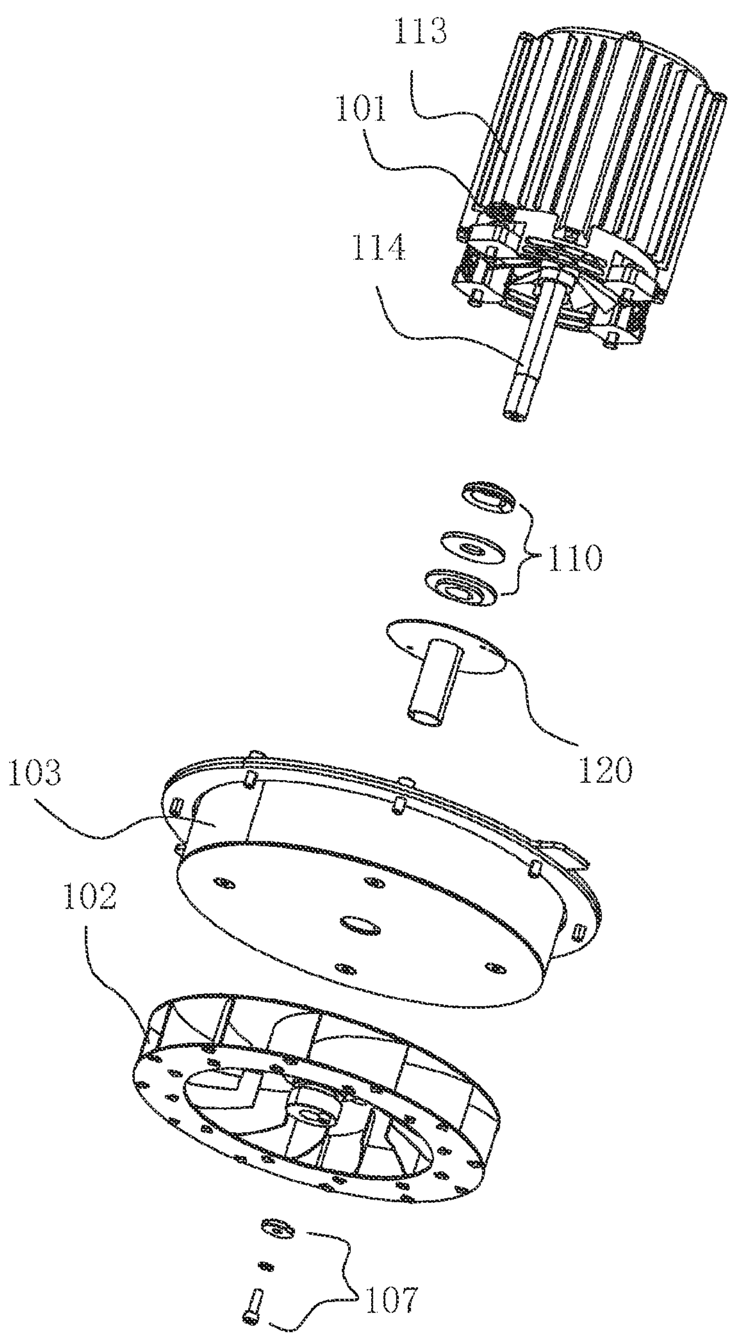
FIG. 1B is an exploded view of the fan assembly of FIG. 1A.

FIG. 1A is a perspective view of a fan assembly in the present application, FIG. 1B is an exploded view of the fan assembly of FIG. 1A, and FIGS. 1A and 1B illustrate components of the fan assembly.

The fan assembly in the present application is mounted on a reflow oven, which has a furnace enclosed by a furnace housing. When the reflow oven is operated, the furnace maintains a high temperature inside to process electronic elements. The furnace housing has several fan mounting holes for mounting the fan assembly in the present application. The fan assembly is used to enhance air flow inside the furnace so that the temperature inside the furnace is evenly distributed.

As shown in FIGS. 1A and 1B, a fan assembly 100 includes a motor 101, an insulation device 103, an impeller 102, an isolation sleeve 120, a sealing device 110, and a fastener assembly 107. The motor 101 includes a motor body 113 and a motor shaft 114 on which the insulation device 103, the impeller 102, the isolation sleeve 120, and the sealing device 110 are sleeved. The insulation device 103 is located between the impeller 102 and the motor body 113, and the fastener assembly 107 secures the impeller 102 to the motor shaft 114. When the fan assembly is mounted on the housing of the reflow oven, the impeller 102 is located inside the furnace, the motor body 113 is located outside the furnace, and the insulation device 103 seals the fan mounting holes on the housing to prevent gas exchange between the interior of the furnace and the exterior of the furnace. There is also the sealing device 110 between the insulation device 103 and the motor body, which is disposed about the motor shaft 114 to prevent gas exchange between the gas inside and outside the furnace through a gap between the motor shaft 114 and the insulation device 103.

There is also the isolation sleeve 120 on the motor shaft 114, and a majority of the isolation sleeve 120 is located in the insulation device 103 to prevent the flux inside the furnace from adhering to the motor shaft 114. Specific structures of the components of the fan assembly 100 are described in detail below.

Figure 2A:
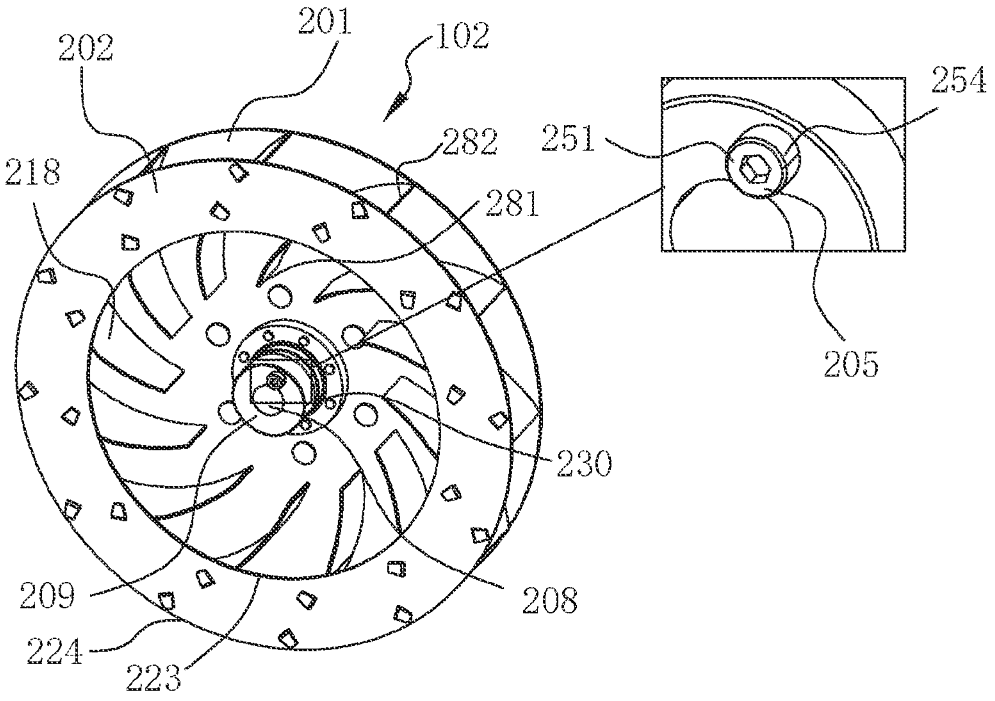
FIG. 2A is a perspective view of an impeller of FIG. 1B.
Figure 2B:
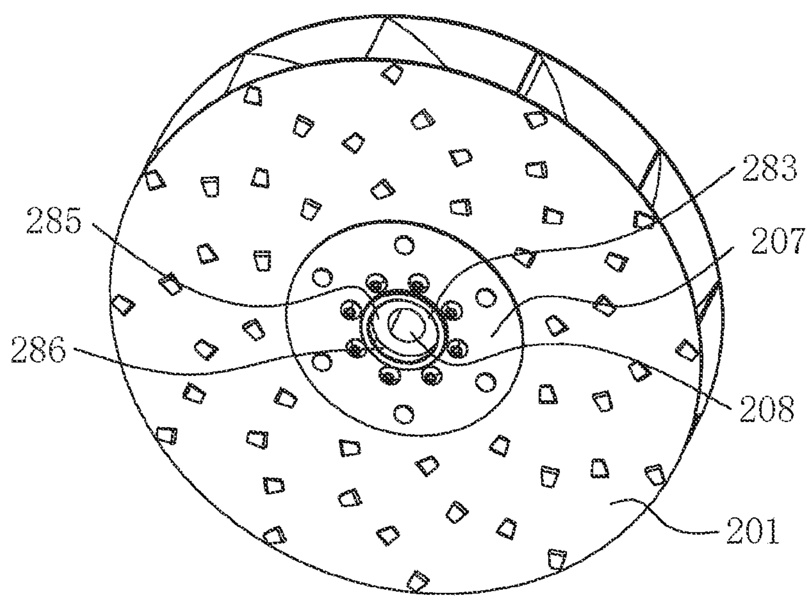
FIG. 2B is a perspective view of the impeller of FIG. 2A at another angle.

FIG. 2A is a perspective view of the impeller of FIG. 1B, FIG. 2B is a perspective view of the impeller of FIG. 2A at another angle, FIG. 2A illustrates a side of the impeller 102 away from the motor, and FIG. 2B illustrates a side of the impeller 102 toward the motor. As shown in FIG. 2A, the impeller 102 includes a first wheel 201, a second wheel 202, a plurality of blades 218, and a mounting portion 230. The mounting portion 230 is disposed in the center of the impeller 102 and has a proximal surface 207 and a distal surface 209 and an impeller center bore 208 running through the proximal surface 207 and the distal surface 209. The proximal surface 207 faces the motor body 113, the distal surface 209 faces away from the motor body 113, and the motor shaft 114 is capable of passing through the impeller center bore 208.

The first wheel 201 extends along a radial direction from a side of the mounting portion 230 near the proximal surface 207. The second wheel 202 and the first wheel 201 are arranged along an axial direction of the impeller 102, and the second wheel 202 is generally annular and has an outer edge 223 and an inner edge 224. The plurality of blades 218 are uniformly arranged between and connected to the second wheel 202 and the first wheel 201. Each blade 218 is generally curved sheet-like and has a blade inner side 281 and a blade outer side 282. In the radial direction, the blade outer side 282 is roughly flush with outer edges of the second wheel 202 and the first wheel 201, and the blade inner side 281 exceeds the inner edge 224 of the second wheel 202, and has a spacing from the mounting portion 230. That is, in the radial direction, the blade inner side 281 is located between the mounting portion 230 and the inner edge 224 of the second wheel 202.

As shown in FIG. 2A, a second positioning mark 205 is provided on the distal surface 209 of the mounting portion 230. The second positioning marker 205 is a positioning convex portion 251 protruding from the distal surface 209. In an embodiment of the present application, a receiving groove is provided on the mounting portion 230, and a positioning bolt can be threaded into the receiving groove of the mounting portion 230. A head 254 of the positioning bolt is larger than a diameter of the receiving groove, thereby being blocked by the distal surface 209 and located outside the mounting portion 230 to form the positioning convex portion 251. In another embodiment, the positioning marker 205 is a convex or recess portion disposed on the distal surface 209, or a convex or recess portion disposed on the first wheel 201 or the second wheel 202.

As shown in FIG. 2B, the proximal surface 207 of the mounting portion 230 is roughly flush with the first wheel 201. The mounting portion 230 has a recess 283 recessed from the proximal surface 207 towards the proximal surface 208. The recess 283 is disposed about the center bore 208. The recess 283 has a bottom 285 and a sidewall 286 extending along an axial direction of the impeller 102 from the outer side of the bottom 285, the bottom 285 extending along the radial direction of the impeller 102, the inner side of the bottom 285 interfacing with the center bore 208.

Figure 3:
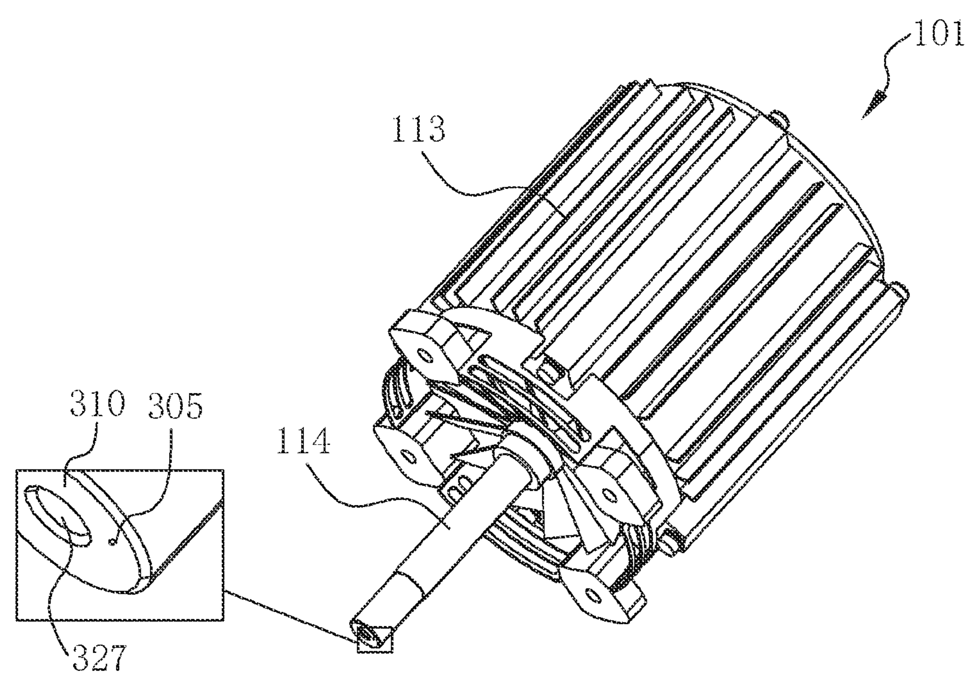
FIG. 3 is a perspective view of a motor of FIG. 1B.

FIG. 3 is a perspective view of the motor of FIG. 1B, and as shown in FIG. 3, the motor 101 includes a motor body 113 and a motor shaft 114. The motor shaft 114 is connected to the motor body 113, which is capable of driving the motor shaft 114 to rotate. A distal end of the motor shaft 114 has an end surface 310 and a receiving hole 327 formed by recessing inwardly from the end surface 310, and the inner wall of the receiving hole 327 is provided with threads.

The end surface 310 is provided with a first positioning marker 305, which is a positioning recess formed by recessing inwardly from the distal surface 310. The first positioning marker 305 is offset from a central axis of the motor shaft 114.

In an embodiment of the present application, the first positioning marker 305 is provided on a side of the distal end of the motor shaft 114, but satisfies that at least a portion of the first positioning marker 305 can be visible at the end surface 310 when viewed along the axial direction of the motor shaft 114 toward the end surface 310.

In another embodiment of the present application, the first positioning marker 305 is convex, or another identifiable shape.

Figure 4:
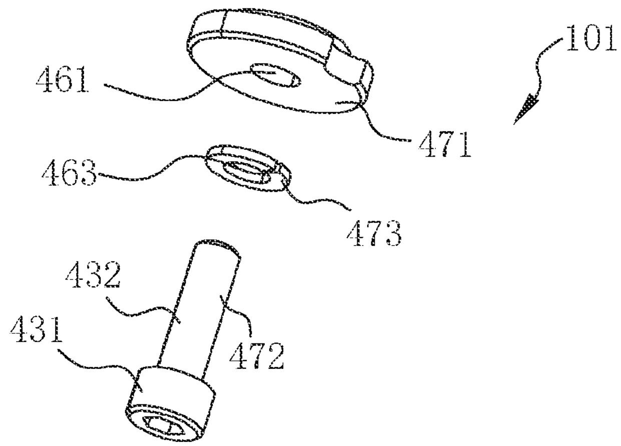
FIG. 4 is a perspective view of a fastener assembly of FIG. 1B.

FIG. 4 is a perspective view of the fastener assembly of FIG. 1B, and as shown in FIG. 4, the fastener assembly 107 includes a positioning gasket 471, a fastening bolt 472, and a gasket 473. The positioning gasket 471 has a gasket hole 461 and the gasket 473 has a gasket hole 463. The fastening bolt 472 has a larger-diameter head 431 and a smaller-diameter body 432 with external threads. The fastener assembly 107 is configured to secure the impeller 102 to the motor shaft 114 to enable the motor shaft 114 to rotate together with the impeller 102.

Figure 5A:
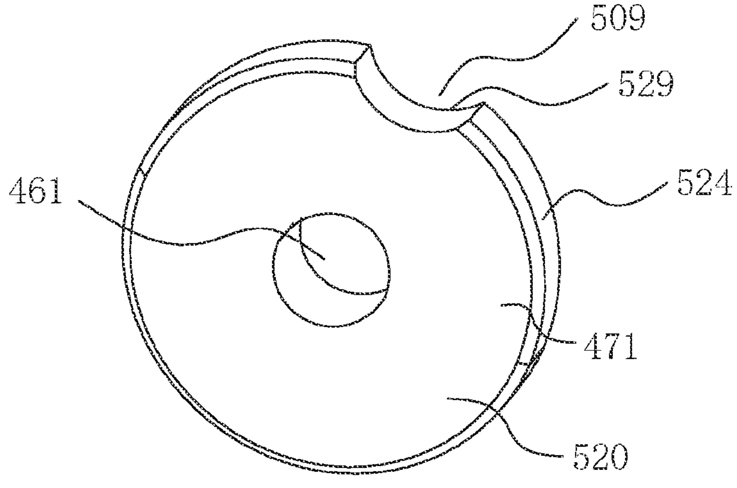
FIG. 5A is a perspective view of a positioning gasket of FIG. 4.
Figure 5B:
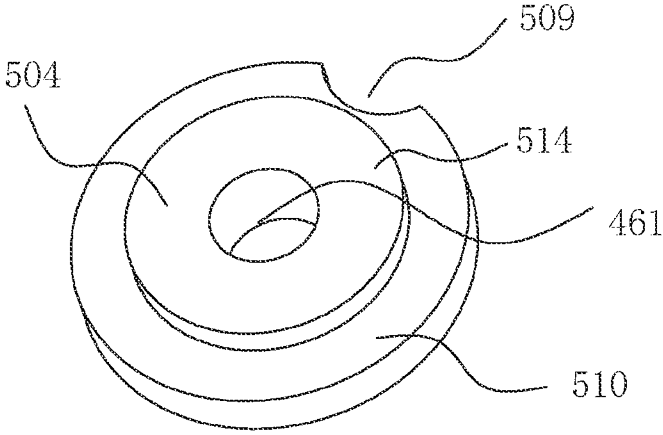
FIG. 5B is a perspective view of the positioning gasket of FIG. 4 at another angle.

FIG. 5A is a perspective view of the positioning gasket in FIG. 4, FIG. 5B is a perspective view of the positioning gasket in FIG. 4 at another angle, FIG. 5A shows a side of the positioning gasket 471 away from the impeller 102, and FIG. 5B shows a side of the positioning gasket 471 facing the impeller 102. The positioning gasket 471 includes a front side 520, a rear side 510, a gasket hole 461 running through the front side 520 and the rear side 510, and an outer edge 524 connecting the front side 520 and the rear side 510. The front side 520 is generally planar. The rear side 510 has an annular convex portion 514 disposed about the gasket hole 461, which is higher than the surface of the rear side 510, forming a step with the surface of the rear side 510. The annular convex portion 514 forms a joint 504 that is capable of entering the impeller center bore 208 to contact the motor shaft 114.

The positioning gasket 471 also has a recess 529 formed by recessing inwardly from the outer edge 524, the recess 529 being generally arcuate, its shape matching the shape of the positioning convex portion 251. The recess 529 forms a stop opening 509 of the positioning gasket 471 that is capable of engaging with the positioning convex portion 251 to limit rotation of the positioning gasket 471 and the motor shaft 114 connected to the positioning gasket 471 relative to the impeller 102. In another embodiment of the present application, the stop opening 509 is a hole running through the positioning gasket 471 that can be fitted on the positioning convex portion 251 to limit rotation of the positioning gasket 471 relative to the impeller 102.

In the present application, the impeller 102 and the motor shaft 114 are provided detachably because the sealing device 110 is susceptible to damage during use of the fan assembly, which affects sealing performance of the fan assembly 100. When the sealing device 110 needs to be replaced, components of the fan assembly 100 may be disassembled to facilitate replacement of the sealing device 110. At the first mounting of the fan assembly, dynamic balance measurement is required so that the mounted fan assembly can reach dynamic balance during operation. Under dynamic balance, the fan assembly has less noise and vibration and long service life. During remounting of the fan assembly, it is also necessary to ensure that the fan assembly can reach dynamic balance during operation.

During mounting of the fan assembly, when the impeller 102 is fixedly connected to the motor shaft 114, it is necessary to align the impeller 102 with the motor shaft 114 at a particular position in the radial direction by measurement so that the fan assembly 100 reaches dynamic balance during operation. This is due to the fact that the impeller 102 is not uniform in parts of the impeller 102 to some extent due to limitations of machining accuracy after the manufacturing of the impeller 102 is complete, and the fan assembly 100 can only reach dynamic balance when the impeller 102 is at a particular position relative to the motor shaft 114. Each time the impeller 102 and the motor shaft 114 are reassembled, the relative position of the impeller 102 and motor shaft 114 needs to be adjusted to enable the fan assembly 100 to reach dynamic balance. For the same set of impeller 102 and motor shaft 114, the relative position of the impeller 102 and the motor shaft 114 that enables the fan assembly 100 to reach dynamic balance is a particular position determined by the nature of each impeller 102 itself, which can be found after dynamic balance measurement is performed. When the impeller 102 and the motor shaft 114 reach this particular position, the impeller 102 and the motor shaft 114 are mounted in place in the radial direction. After the impeller 102 is disassembled from the motor shaft 114 and remounted, the impeller 102 and the motor 101 are first mounted in place in the radial direction, and then the impeller 102 and the motor 101 are mounted in place om the axial direction with the fastener assembly, that is, the remounting of the impeller 102 and the motor 101 is completed. The second mounting of the fan assembly eliminates the need for another dynamic balance measurement to allow the fan assembly to reach dynamic balance during operation. In the present application, the first and second positioning marks 305, 205 are used to identify positions at which the impeller 102 and the motor 101 are mounted in place in the radial direction. When the impeller 102 is mounted, the fan assembly 100 can be brought to dynamic balance by being mounted at the positions shown by the first and second positioning marks 305, 205.

Figure 6:
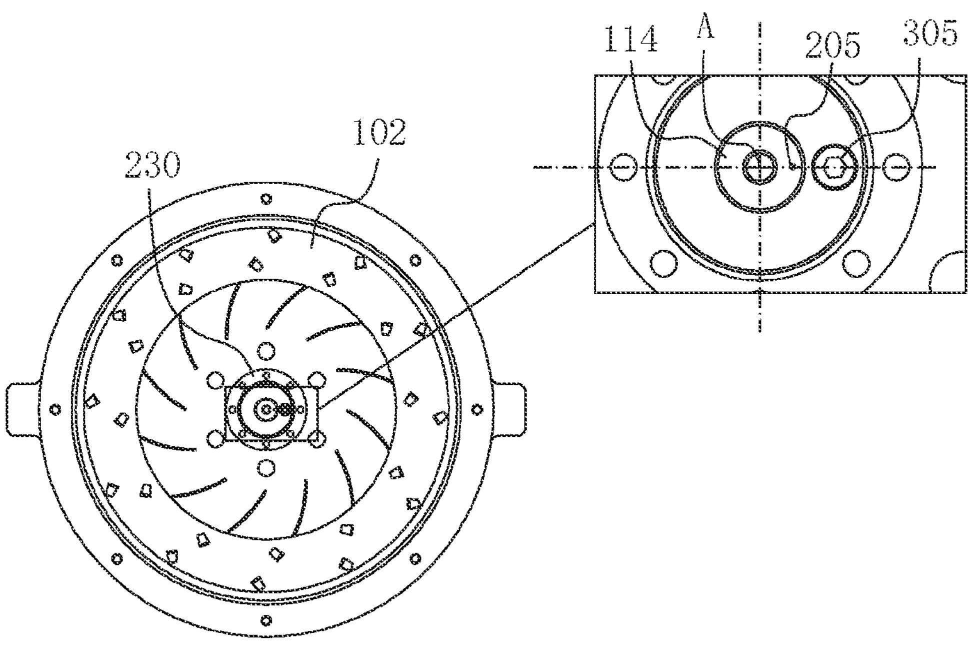
FIG. 6 is a view taken along an axial direction when the impeller and a motor shaft are mounted in place in a radial direction.

FIG. 6 is a view of the impeller and the motor shaft mounted in place in the radial direction along a side of the impeller facing away from the motor body, with the fastener assembly omitted from the view of FIG. 6. FIG. 6 illustrates the positional relationship of the first and second positioning marks 305, 205 when the impeller and the motor shaft 114 are mounted in place in the radial direction. As shown in FIG. 6, the motor shaft 114 has a central axis A extending along the axial direction, in which the central axis A, the second positioning marker 205, and the first positioning marker 305 are all on the same straight line, that is, the central axis A, the second positioning marker 205, and the first positioning marker 305 are all on the same diameter of the fan assembly. In this case, the end surface 310 of the motor shaft 114 is lower than the distal surface 209 of the mounting portion 230.

In an embodiment of the present application, the first positioning marker 305 marks when the impeller 102 is made and the second positioning marker marks on the motor shaft 114 by an operator after dynamic balance measurement is completed. In another embodiment of the present application, the second positioning marker 205 marks when the motor shaft 114 is made, and the first positioning marker marks on the impeller 102 by the operator after dynamic balance measurement is completed. Once the impeller and the motor shaft 114 are mounted in place in the radial direction, the impeller 102 and the motor shaft 114 are mounted in place in the axial direction using the fastener assembly, i.e., a fixed connection of the motor shaft 114 to the impeller 102 is completed.

Figure 7:
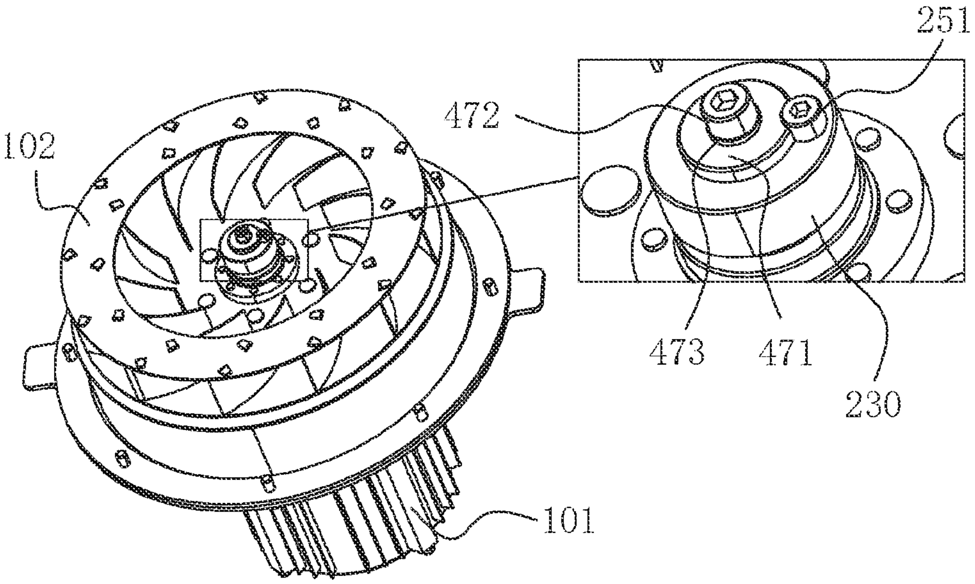
FIG. 7 is a perspective view of the fan assembly when the impeller and the motor shaft are mounted in place in the radial direction.

FIG. 7 is a perspective view of the fan assembly when the impeller and motor shaft are mounted in place in the radial direction. As shown in FIG. 7, when the motor shaft 114 and the impeller 102 are mounted in place in the radial direction, the motor shaft 114 and the impeller 102 are fixed at this position to prevent rotation of the impeller 102 relative to the motor shaft 114. The positioning gasket 471 is then mounted into the mounting portion 230 of the impeller 102 such that the joint 504 of the positioning gasket 471 (see FIG. 5) enters the impeller center bore 208 and is in contact with the end surface 310 of the motor shaft 114. In addition, the positioning convex portion 251 of the mounting portion 230 enters the stop opening 509 of the positioning gasket 471, so that the positioning gasket 471 cannot rotate relative to the impeller 102. The fastening bolt 472 sequentially passes through the gasket hole 463 of the gasket 473 and the gasket hole 461 of the positioning gasket 471 into the receiving hole 327 on the motor shaft 114, and the fastening bolt 472 fastens the impeller 102 and the motor shaft 114 in the axial direction by fitting with the threads of the receiving hole 327. When the fastening bolt is rotated in place, the positioning gasket 471 is pressed against the motor shaft 114 so that the motor shaft 114 cannot rotate relative to the positioning gasket 471. Since the positioning gasket 471 mates with the positioning convex portion 251 through the stop opening 509 such that the impeller 102 cannot rotate relative to the positioning gasket 471, so that the impeller 102 cannot rotate relative to the motor shaft 114, the impeller 102 and the motor shaft 114 are mounted in place in the axial direction. When the impeller 102 and the motor shaft 114 are mounted in place in both the radial direction and the axial direction, the fan assembly reaches dynamic balance during operation. In an embodiment of the present application, the gasket 473 is a spring gasket that facilitates connection between the fastener assembly 107 and the motor shaft 114.

Figure 8A:
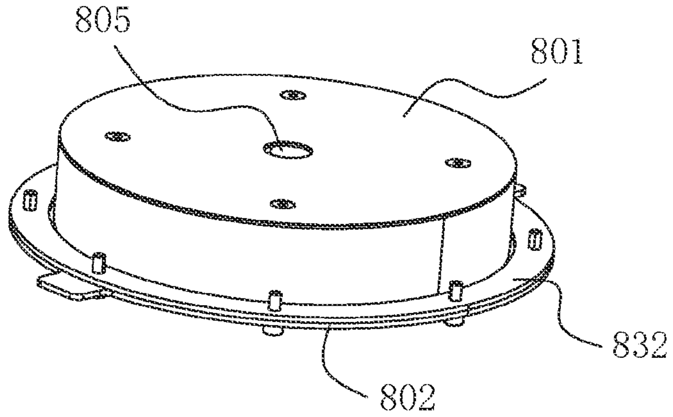
FIG. 8A is a perspective view of a insulation device in the present application.
Figure 8B:
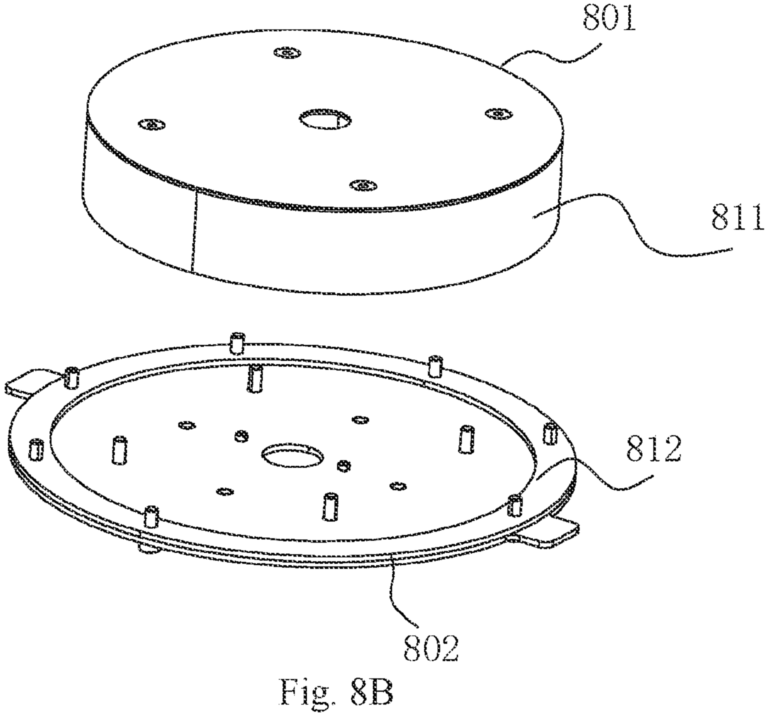
FIG. 8B is an exploded view of the insulation device of FIG. 8A.

FIG. 8A is a perspective view of the insulation device in the present application and FIG. 8B is an exploded view of the insulation device in FIG. 8A. As shown in FIGS. 8A and 8B, the insulation device 103 includes an insulation device front side surface 801 facing the impeller 102 and an insulation device rear side surface 802 facing the motor body 113, and an insulation device center bore 805 running through the insulation device front side surface 801 and the insulation device rear side surface 802. When the fan assembly is mounted in the reflow oven, the insulation device front side surface 801 faces the inside of the furnace of the reflow oven and the insulation device rear side surface 802 faces the outside of the furnace of the reflow oven. The motor shaft 114 can be connected to the impeller 102 through the insulation device center bore 805. The insulation device includes a layer of thermally insulating material 811 and a mounting baseplate 812. The layer of thermally insulating material 811 is connected to the mounting baseplate 812, a diameter of the mounting baseplate 812 is larger than a diameter of the layer of thermally insulating material 811, thereby forming an annular mounting flange 832 for connecting to the furnace housing of the reflow oven, and the layer of thermally insulating material 811 is used for heat exchange inside and outside the furnace.

Figure 9:
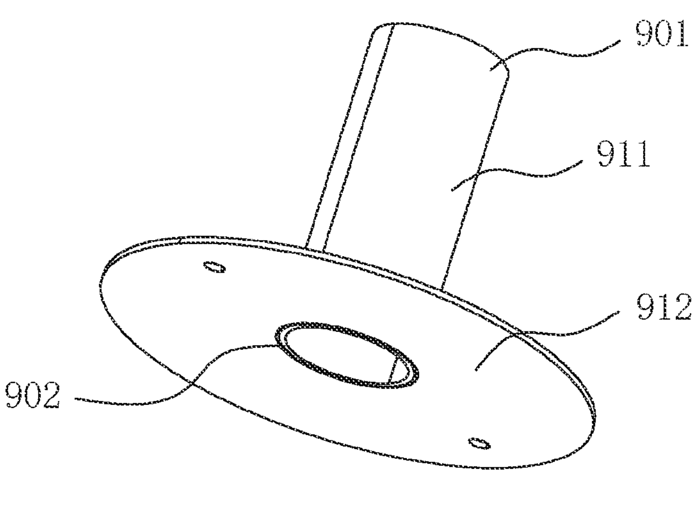
FIG. 9 is a perspective view of an isolation sleeve of FIG. 1B.

FIG. 9 is a perspective view of the isolation sleeve in FIG. 1B. As shown in FIG. 9, the isolation sleeve 120 includes a sleeve 911 and an isolation sleeve flange 912 formed radially outward from the proximal end 902 of the sleeve. The isolation sleeve 120 is mounted in the insulation device 103. The outer diameter of the sleeve 911 is smaller than the inner diameter of the insulation device center bore 805, and the outer diameter of the isolation sleeve flange 912 is larger than the inner diameter of the insulation device center bore 805. The sleeve 911 is integral with the isolation sleeve flange 912, the sleeve 911 is integrally formed with the isolation sleeve flange 912, or the isolation sleeve flange 912 is connected to the sleeve 911 by welding or the like. The joint of the sleeve 911 to the isolation sleeve flange 912 is a continuously extending structure so that fluid flowing along the outer wall of the sleeve 911 toward the isolation sleeve flange 912 can be blocked by the isolation sleeve flange 912 without continuing to flow downward.

Figure 10:
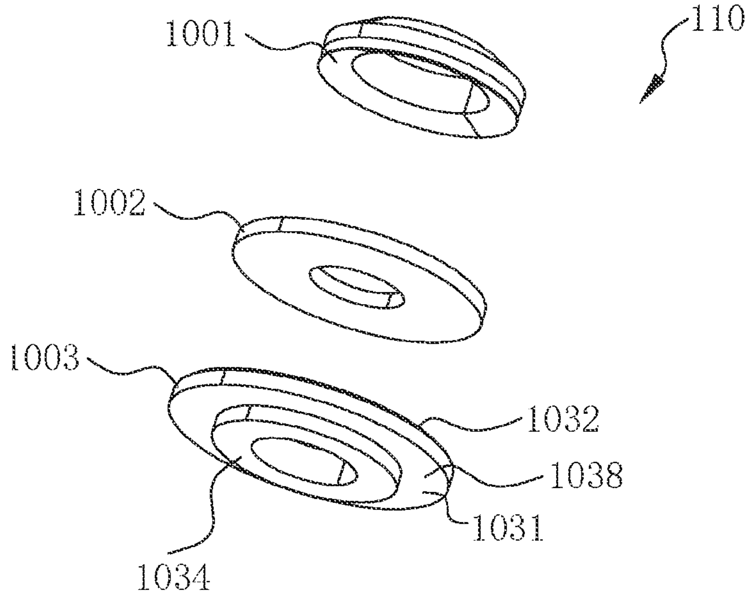
FIG. 10 is a perspective view of a sealing device of FIG. 1B.

FIG. 10 is a perspective view of the sealing device of FIG. 1B. As shown in FIG. 10, the sealing device includes an annular elastic gasket 1001, a graphite gasket 1002, and a metal gasket 1003. The sealing device 110 is sleeved on the motor shaft 114 and is located between the insulation device 103 and the motor body 113. The elastic gasket 1001 is near the motor body 113, the metal gasket 1003 is near the insulation device 103, and the graphite gasket 1002 is located between the elastic gasket 1001 and the metal gasket 1003. A first side 1031 of the metal gasket 1003 has a first side surface 1038 and a convex portion 1034 protruding from the first side surface 1038 that is capable of entering the insulation device center bore 805 (see FIG. 11B). When the fan assembly 100 is mounted on the reflow oven, the graphite gasket 1002 is capable of preventing flow of gas inside and outside the furnace along a gap near the motor shaft 114. The sealing device 110 and the insulation device 103 cooperate such that sealing is formed between the impeller 102 and the motor body 113 of the fan assembly mounted on the furnace housing, thereby preventing gas exchange inside and outside the furnace.

As the motor shaft 114 rotates, the elastic gasket 1001 and the graphite gasket 1002 rotate together following the motor shaft 114. The graphite gasket 1002 is in contact with a second side 1032 of the metal gasket 1003, and has a smooth surface, resulting in less friction with the second side 1032 of the smooth metal gasket 1003, which facilitates rotation of the motor shaft 114. The graphite gasket 1002 will wear out and become thinner during rotation, and the elastic gasket 1001 has a certain amount of elastic force, which pushes the graphite gasket 1002 towards the metal gasket 1003 when the graphite gasket 1002 becomes thinner, so as to ensure that the graphite gasket 1002 is in constant contact with the metal gasket 1003.

When the graphite gasket 1002 is severely worn and cannot provide a sealing effect, the graphite gasket 1002 needs to be replaced. Replacing the graphite gasket 1002 requires disassembly of the impeller 102 from the motor 101, and the providing of the first and second positioning marks 305, 205 can eliminate the step of readjusting the dynamic balance of the impeller when replacing the graphite gasket.

Figure 11A:
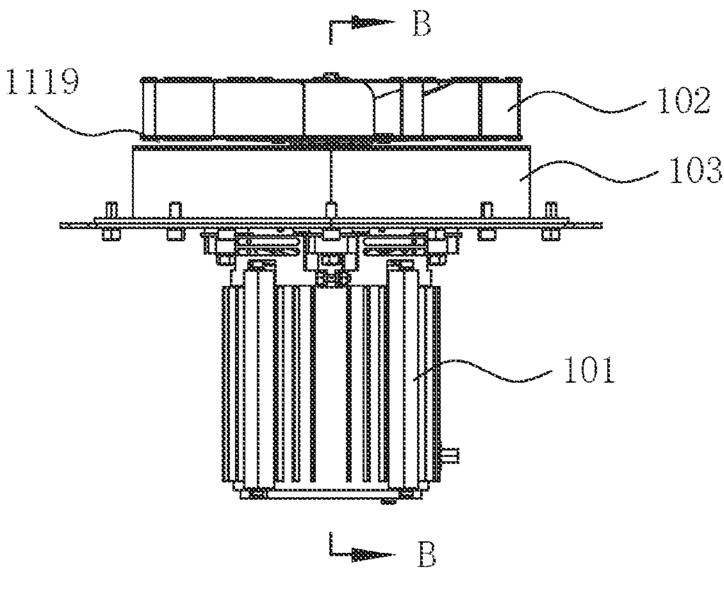
FIG. 11A is a side view of the fan assembly of FIG. 1A.
Figure 11B:
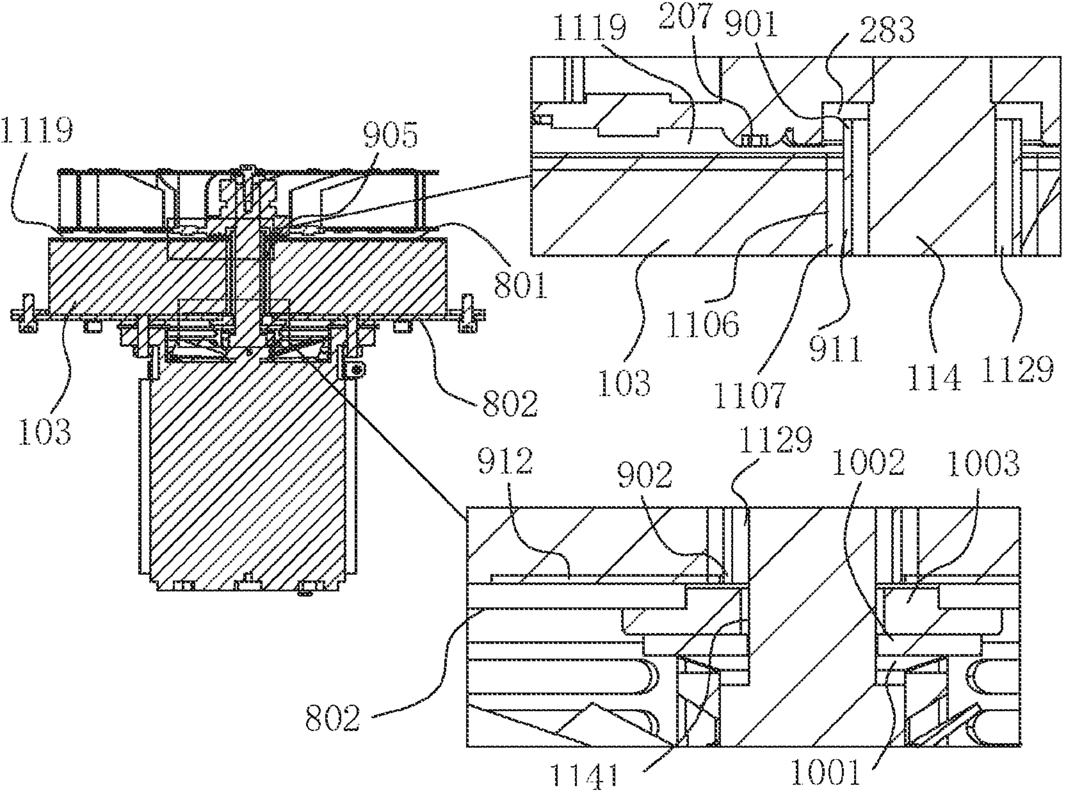
FIG. 11B is a cross-sectional view of the fan assembly of FIG. 11A cut along line B-B.
Figure 11C:
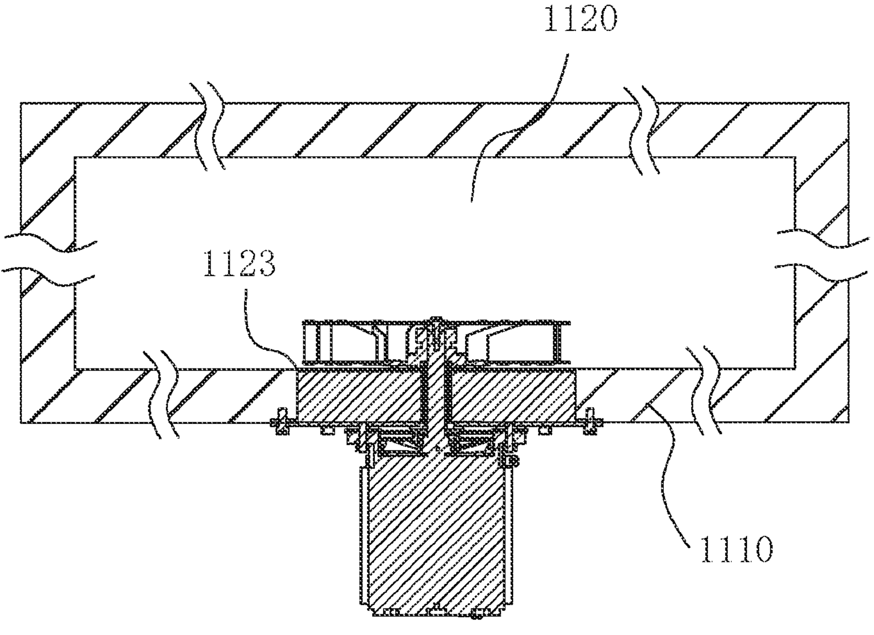
FIG. 11C is a schematic view of the fan assembly of FIG. 11B mounted in a furnace housing.

FIG. 11A is a side view of the fan assembly of FIG. 1A, FIG. 11B is a cross-sectional view of the fan assembly of FIG. 11A cut along line B-B, and FIG. 11C is a schematic view of the fan assembly of FIG. 11B mounted in the furnace housing.

As shown in FIG. 11C, the reflow oven has a furnace housing 1110 that encloses a furnace 1120. A higher temperature is maintained within the furnace 1120 to process electronics. The furnace 1120 has a fan mounting hole 1123 that is roughly sized to match the size of the layer of thermally insulating material of the insulation device 103 so that the fan mounting hole 1123 can be sealed by the layer of thermally insulating material 811. The mounting flange 832 has an outer diameter greater than the outer diameter of the fan mounting hole 1123, and when the layer of thermally insulating material 811 enters the fan mounting hole, the layer of thermally insulating material 811 abuts against the outside of the furnace housing. The insulation device 103 can be connected to the outside of the furnace housing 1110 by a fastener (e.g., a bolt) so that the insulation device 103 is connected to the furnace housing 1110. The mounting baseplate 812 can cover the gap between the layer of thermally insulating material 811 and the fan mounting hole 1123. The impeller 102 is located inside the furnace 1120 and the motor body 113 is located outside the furnace 1120. The sealing device 110 and the insulation device 103 are disposed between the motor body 113 and the impeller 102 to form sealing between the motor body 113 and the impeller 102. The motor 101 is capable of driving the impeller 102 to rotate, thereby enhancing the air flow inside the furnace 1120, so that the temperature distribution inside the furnace 1120 is uniform. The fan assembly 100 in the present application is typically mounted on the top or at the bottom of the furnace 1120, and FIG. 11C illustrates the fan assembly mounted at the bottom of the furnace 1120.

As shown in FIGS. 11A and 11B, the isolation sleeve flange 912 is fixedly connected to the mounting baseplate 812 by a fastener, such as a screw, and is located between the layer 811 of thermal insulation material and the mounting baseplate 812. The sleeve 911 passes through the insulation device center bore 805 and is sleeved on the motor shaft 114 so that the sleeve 911 is located in the layer of insulation material 811 and between the insulation device 103 and the motor shaft 114. There is a gap between the sleeve 911 and the motor shaft 114 to facilitate rotation of the motor shaft 114 relative to the sleeve 911. A distal end 901 of the sleeve 911 enters the recess 283 of the mounting portion 230 of the impeller 102 beyond the insulation device front side surface 801. That is, the distal end 901 of the sleeve 911 exceeds the proximal surface 207 of the mounting portion 230 of the impeller. The front side surface 801 of the insulation device 103 has a distance from the impeller 102, forming a gap 1119. As shown in FIG. 11B, the distal end 901 of the sleeve 911 is located above the gap 1119 and the proximal end 902 of the sleeve 911 is located below the gap 1119 so that in the radial direction of the motor shaft 114, the sleeve 911 isolates the motor shaft 114 from the gap 1119. That is, the airflow in the gap 1119 is blocked by the sleeve 911 as the air flows along the radial direction of the motor shaft 114 towards the motor shaft 114. The sleeve 911 has a spacing from an inner wall 1106 of the insulation device center bore 805 to form a first annular space 1107 capable of containing a small amount of fluid. The bottom of the first annular space 1107 is blocked by the isolation sleeve flange 912.

In an existing fan assembly, there is a gap between the motor shaft 114 and the insulation device center bore 805 as the insulation device 103 is fixed on the furnace housing without rotating with the motor shaft 114, so as to facilitate rotation of the motor shaft 114. There are some flux droplets present in the gas inside the furnace 1120, which are viscous and will affect the rotation of the motor shaft 114 if adhered to the motor shaft 114. In an existing fan assembly, flux droplets may enter the space between the motor shaft 114 and the insulation device 103, so that the flux adheres to the motor shaft 114, which increases resistance to rotation of the motor shaft 114, and affects the service life of the motor 101. The isolation sleeve 120 in the present application can alleviate this problem.

As shown in FIG. 11B, there is a gap 1119 between the impeller 102 and the insulation device 103, the gap 1119 is in communication with the furnace 1120 so that flux containing gas can enter the gap 1119, and when the flux containing gas flows along the radial direction towards the motor shaft 114, the gas is blocked by the sleeve 911 and cannot reach the motor shaft 114, thereby avoiding adhesion of the flux to the motor shaft 114. When the fan assembly 100 is mounted at the bottom of the furnace 1120, the motor shaft 114 is disposed along a vertical direction, and the impeller 102 is located above the insulation device 103. A portion of the flux in the gap 1119 is deposited by gravity on the insulation device front side surface 801, and may flow into the first annular space 1107 between the sleeve 911 and the inner wall of the insulation device center bore 805 and down to above the isolation sleeve flange 912. Blocked by the isolation sleeve flange 912, the flux cannot continue to flow downward, and may be absorbed by the layer of insulating material 811 when flowing along the radial direction toward the layer of insulating material 811, or deposited at the bottom of the first annular space 1107 without affecting the motor shaft 114. The gap between the distal end 901 of the sleeve 911 and the bottom 285 of the recess 283 and the sidewall 286 is small, with little or no flux reaching the motor shaft 114 through the gap between the distal end 901 of the sleeve 911 and the recess 283.

In the present application, the isolation sleeve 120 of the fan assembly mounted at the bottom of the furnace 1120 can prevent the motor shaft 114 from being affected by the flux and extend the service life of the motor 101. While the impeller 102 of the fan assembly mounted on the top of the furnace 1120 is located above the insulation device 103, the flux in the gap 1119 will be deposited on the surface of the impeller by gravity. While the impeller 102 is fixedly connected to the motor shaft 114, the impeller 102 rotates following the motor shaft 114, there is no or little gap between the impeller 102 and the motor shaft 114, and the flux cannot enter to affect the motor shaft 114. The isolation sleeve 120 does not need to be provided in the fan assembly mounted on the top of the furnace 1120.

In the present application, there is a gap between the motor shaft 114 and the inner wall of the isolation sleeve 120, thereby forming a second annular space 1129 surrounding the motor shaft 114, and the second annular space 1129 is provided to avoid contact with the inner wall of the isolation sleeve 120 when the motor shaft 114 rotates. The upper portion of the second annular space 1129 is in fluid communication with the interior of the furnace. In some applications, the gas inside the furnace of the reflow oven uses inert gas (e.g., nitrogen gas) as the working atmosphere. In this case, the furnace needs to be a relatively closed environment to prevent outside air from entering the interior of the furnace and affecting the working atmosphere inside the furnace. Thus, in the fan assembly, a lower opening of the second annular space 1129 is sealed using the sealing device 110 to prevent outside air from entering the interior of the furnace through the second annular space 1129 and affecting the working atmosphere inside the furnace.

In connection with FIGS. 10 and 11B, the metal gasket 1003 is sleeved on the motor shaft 114, and the convex portion 1034 of the metal gasket 1003 enters the insulation device center bore 208 and is located below the isolation sleeve flange 912. The first side surface 1038 of the metal gasket 1003 fits with the insulation device rear side surface 802. The hole of the metal gasket 1003 is slightly larger than the outer diameter of the motor shaft 114, forming an annular channel 1141 with the motor shaft 114. During rotation of the motor shaft 114, the metal gasket 1003 does not rotate following the motor shaft 114. The second annular space 1129 is in communication with the annular channel 1141 having an outer diameter less than the outer diameter of the second annular space 1129. The holes of the elastic gasket 1001 and the graphite gasket 1002 are near to the outer diameter of the motor shaft 114, the graphite gasket 1002 is sleeved on the motor shaft 114 and forms sealing with the motor shaft 114, and the graphite gasket 1002 fits with the second side 1032 of the metal gasket 1003, so that the graphite gasket 1002 seals the lower opening of the annular channel 1141 to isolate gas exchange along both sides of the graphite gasket 1002 in the axial direction of the motor shaft 114. The sealing device 110 collectively seals the lower opening of the second annulus 1129 through the metal gasket 1003 and the graphite gasket 1002 to avoid loss of gas inside the furnace or prevent outside gas from entering the furnace.

The fan assembly in the present application is applied to the reflow oven, and therefore the sealing device 110 is required to ensure the working atmosphere inside the furnace. As described above, the graphite gasket 1002 in the sealing device 110 is a quick-wear piece that needs to be replaced. When the graphite gasket 1002 needs to be replaced, the impeller 102 needs to be disassembled from the motor 101 and mounted again after the replacement is complete. The fan assembly in the present application is able to reach dynamic balance after the motor 101 and the impeller 102 are remounted by providing the first positioning marker and the second positioning marker. Moreover, the fan assembly in the present application strengthens the fastening connection between the motor 101 and the impeller 102 by the positioning gasket.

Although the present disclosure has been described in connection with examples of the embodiments outlined above, various alternatives, modifications, variations, improvements, and/or substantial equivalents, whether known or foreseeable now or in the near future, may be apparent to those having at least ordinary skill in the art. Therefore, examples of embodiments of the present disclosure as set forth above are intended to be illustrative and not limiting. Various changes may be made without departing from the spirit or scope of the present disclosure. Therefore, the present disclosure is intended to include all known or earlier developed alternatives, modifications, variations, improvements and/or substantial equivalents. The technical effects and technical problems in this specification are exemplary and not limiting. It should be noted that the embodiments described in this specification may have other technical effects and may solve other technical problems.

What is claimed is:

1. A fan assembly, comprising:

a motor having a motor body and a motor shaft extending from the motor body, a distal end of the motor shaft having a first positioning marker with a certain spacing from a central axis of the motor shaft, the distal end of the motor shaft having an end surface, the first positioning marker being at least partially visible on the end surface; and an impeller having an impeller center bore, the impeller provided with a second positioning mark thereon;

wherein when the motor shaft is inserted into the impeller center bore, and the central axis of the motor shaft, the second positioning marker and the first positioning marker are on a same diameter of the fan assembly, the impeller is mounted in place in a radial direction relative to the motor so that the fan assembly reaches dynamic balance during operation, and wherein a position of the impeller is adjustable in a radial direction relative to the motor and relative to the motor shaft.

2. The fan assembly according to claim 1, further comprising:

a sealing device comprising a graphite gasket, the sealing device being sleeved on the motor shaft and disposed between the impeller and the motor body to form sealing between the impeller and the motor body;

wherein the impeller is detachably connected to the motor so that the graphite gasket is replaceable, and the first positioning mark and the second positioning mark enable the impeller to be mounted in place in the radial direction relative to the motor when the impeller is remounted on the motor shaft.

3. The fan assembly according to claim 2, wherein:

the fan assembly is used for a reflow oven, the impeller is located inside a furnace of the reflow oven, the motor body is outside the furnace of the reflow oven, and the sealing device is configured to isolate the interior of the furnace from the exterior of the furnace.

4. The fan assembly according to claim 1, wherein:

the first positioning marker is a positioning recess recessed inwardly from the end surface.

5. The fan assembly according to claim 1, wherein:
the impeller has a mounting portion located in the center of the impeller, the impeller center bore runs through the mounting portion, the mounting portion has a proximal surface facing the motor body and a distal surface facing away from the motor body, and the second positioning marker is a positioning convex portion protruding from the distal surface.

6. A reflow oven, comprising:
a furnace housing in which a furnace is formed; and
the fan assembly according to claim 1, the fan assembly being disposed on the furnace housing, the impeller of the fan assembly being located inside the furnace of the reflow oven, and the motor body being located outside the furnace of the reflow oven.

7. The reflow oven according to claim 6, further comprising:
a sealing device comprising a graphite gasket, the sealing device being sleeved on the motor shaft and disposed between the impeller and the motor body to form sealing between the impeller and the motor body;
wherein the impeller is detachably connected to the motor so that the graphite gasket is replaceable, and the first positioning mark and the second positioning mark enable the impeller to be mounted in place in the radial direction relative to the motor when the impeller is remounted on the motor shaft.

8. The reflow oven according to claim 7, wherein:
the sealing device is configured to isolate the interior of the furnace from the exterior of the furnace.

9. The reflow oven according to claim 7, wherein:
the first positioning marker is a positioning recess recessed inwardly from the end surface.

10. The reflow oven according to claim 6, wherein:
the impeller has a mounting portion located in the center of the impeller, the impeller center bore runs through the mounting portion, the mounting portion has a proximal surface facing the motor body and a distal surface facing away from the motor body, and the second positioning marker is a positioning convex portion protruding from the distal surface.

11. A fan assembly, comprising:
a motor having a motor body and a motor shaft extending from the motor body, a distal end of the motor shaft having a first positioning marker with a certain spacing from a central axis of the motor shaft, the distal end of the motor shaft having an end surface, the first positioning marker being at least partially visible on the end surface;
an impeller having an impeller center bore, the impeller provided with a second positioning mark thereon;
wherein when the motor shaft is inserted into the impeller center bore, and the central axis of the motor shaft, the second positioning marker and the first positioning marker are on a same diameter of the fan assembly, the impeller is mounted in place in a radial direction relative to the motor so that the fan assembly reaches dynamic balance during operation; and
a fastener assembly comprising a positioning gasket and a fastening bolt, wherein the positioning gasket comprises a gasket hole and a joint facing the impeller, the gasket hole of the positioning gasket is aligned with the impeller center bore, the joint of the positioning gasket abuts against the motor shaft, the positioning gasket is clamped between the mounting portion of the impeller and a head of the fastening bolt, and the fastening bolt passes through the gasket hole of the positioning gasket to securely connect to the motor shaft, so as to securely connect the impeller and the motor shaft;
wherein the positioning gasket has a stop opening that engages with a positioning convex portion to limit rotation of the positioning gasket and the motor shaft connected to the positioning gasket relative to the impeller.

12. The fan assembly according to claim 11, wherein:
the stop opening is a recess formed by inwardly recessing an outer edge of the positioning gasket.

13. The fan assembly according to claim 11, wherein:
the positioning gasket comprises a rear side facing the impeller, the rear side is provided with an annular convex portion disposed about the gasket hole, the annular convex portion forms the joint, and the annular convex portion is able to enter the impeller central bore for contact with the motor shaft.

14. A fan assembly, comprising:
a motor having a motor body and a motor shaft extending from the motor body, a distal end of the motor shaft having a first positioning marker with a certain spacing from a central axis of the motor shaft, the distal end of the motor shaft having an end surface, the first positioning marker being at least partially visible on the end surface;
an impeller having an impeller center bore, the impeller provided with a second positioning mark thereon;
wherein when the motor shaft is inserted into the impeller center bore, and the central axis of the motor shaft, the second positioning marker and the first positioning marker are on a same diameter of the fan assembly, the impeller is mounted in place in a radial direction relative to the motor so that the fan assembly reaches dynamic balance during operation; and
wherein the impeller has a mounting portion located in the center of the impeller, the impeller center bore runs through the mounting portion, the mounting portion has a proximal surface facing the motor body and a distal surface facing away from the motor body, and the second positioning marker is a positioning convex portion protruding from the distal surface; and
the positioning convex portion is a positioning bolt mounted on the mounting portion of the impeller.

15. A reflow oven, comprising:
a furnace housing in which a furnace is formed;
a fan assembly, comprising:
a motor having a motor body and a motor shaft extending from the motor body, a distal end of the motor shaft having a first positioning marker with a certain spacing from a central axis of the motor shaft, the distal end of the motor shaft having an end surface, the first positioning marker being at least partially visible on the end surface; and
an impeller having an impeller center bore, the impeller provided with a second positioning mark thereon, wherein when the motor shaft is inserted into the impeller center bore, and the central axis of the motor shaft, the second positioning marker and the first positioning marker are on a same diameter of the fan assembly, the impeller is mounted in place in a radial direction relative to the motor so that the fan assembly reaches dynamic balance during operation, wherein the fan assembly is disposed on the furnace housing, the impeller of the fan assembly being located inside the furnace of the reflow oven, and the motor body being located outside the furnace of the reflow oven;

a fastener assembly comprising a positioning gasket and a fastening bolt, wherein the positioning gasket comprises a gasket hole and a joint facing the impeller, the gasket hole of the positioning gasket is aligned with the impeller center bore, the joint of the positioning gasket abuts against the motor shaft, the positioning gasket is clamped between the mounting portion of the impeller and a head of the fastening bolt, and the fastening bolt passes through the gasket hole of the positioning gasket to securely connect to the motor shaft, so as to securely connect the impeller and the motor shaft; and a sealing device comprising a graphite gasket, the sealing device being sleeved on the motor shaft and disposed between the impeller and the motor body to form sealing between the impeller and the motor body;

wherein the impeller is detachably connected to the motor so that the graphite gasket is replaceable, and the first positioning mark and the second positioning mark enable the impeller to be mounted in place in the radial direction relative to the motor when the impeller is remounted on the motor shaft, and wherein the positioning gasket has a stop opening that engages with the positioning convex portion to limit rotation of the positioning gasket and the motor shaft connected to the positioning gasket relative to the impeller.

16. The reflow oven according to claim 15, wherein:

the stop opening is a recess formed by inwardly recessing an outer edge of the positioning gasket.

17. The reflow oven according to claim 15, wherein:

the positioning gasket comprises a rear side facing the impeller, the rear side is provided with an annular convex portion disposed about the gasket hole, the annular convex portion forms the joint, and the annular convex portion is able to enter the impeller central bore for contact with the motor shaft.

18. A reflow oven, comprising:

a furnace housing in which a furnace is formed;

a fan assembly, comprising:

a motor having a motor body and a motor shaft extending from the motor body, a distal end of the motor shaft having a first positioning marker with a certain spacing from a central axis of the motor shaft, the distal end of the motor shaft having an end surface, the first positioning marker being at least partially visible on the end surface; and an impeller having an impeller center bore, the impeller provided with a second positioning mark thereon, wherein when the motor shaft is inserted into the impeller center bore, and the central axis of the motor shaft, the second positioning marker and the first positioning marker are on a same diameter of the fan assembly, the impeller is mounted in place in a radial direction relative to the motor so that the fan assembly reaches dynamic balance during operation, wherein the fan assembly is disposed on the furnace housing, the impeller of the fan assembly being located inside the furnace of the reflow oven, and the motor body being located outside the furnace of the reflow oven, wherein the impeller has a mounting portion located in the center of the impeller, the impeller center bore runs through the mounting portion, the mounting portion has a proximal surface facing the motor body and a distal surface facing away from the motor body, and the second positioning marker is a positioning convex portion protruding from the distal surface, and wherein the positioning convex portion is a positioning bolt mounted on the mounting portion of the impeller.

* * * * *